United States Patent
Zeng

(10) Patent No.: US 9,958,594 B2
(45) Date of Patent: May 1, 2018

(54) BACKLIGHT MODULE AND DISPLAY DEVICE

(71) Applicant: Wuhan China Star Optoelectronics Technology Co., Ltd., Wuhan, Hubei (CN)

(72) Inventor: Jie Zeng, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 133 days.

(21) Appl. No.: 14/784,121

(22) PCT Filed: Jun. 30, 2015

(86) PCT No.: PCT/CN2015/083001
§ 371 (c)(1),
(2) Date: Oct. 13, 2015

(87) PCT Pub. No.: WO2016/197424
PCT Pub. Date: Dec. 15, 2016

(65) Prior Publication Data
US 2017/0139099 A1 May 18, 2017

(30) Foreign Application Priority Data
Jun. 9, 2015 (CN) .......................... 2015 1 0311691

(51) Int. Cl.
*F21V 7/04* (2006.01)
*F21V 8/00* (2006.01)

(52) U.S. Cl.
CPC ........... *G02B 6/005* (2013.01); *G02B 6/0053* (2013.01); *G02B 6/0055* (2013.01)

(58) Field of Classification Search
CPC .... G02B 6/0001; G02B 6/0011; G02B 6/033; G02B 6/005; G02B 6/0051; G02B 6/0055;
(Continued)

(56) References Cited

U.S. PATENT DOCUMENTS 8,134,675 B2 * 3/2012 Kawaguchi ....... G02F 1/133308
349/149
2013/0010411 A1 * 1/2013 Wu ........................... G09F 9/30
361/679.01
(Continued)

FOREIGN PATENT DOCUMENTS

CN 202521397 U * 11/2012
CN 103698937 A 4/2014
(Continued)

OTHER PUBLICATIONS

Translation of CN 202521397 U.*
Translation of Written Comments from the International Searching Authority.*

*Primary Examiner* — Jason Moon Han
(74) *Attorney, Agent, or Firm* — Andrew C. Cheng

(57) ABSTRACT

The present invention provides a backlight module and a display device. The backlight module comprises a glue frame, a light source, a circuit board, a light guide plate and a quantum dot film, and the light source comprises a first lateral surface, a second lateral surface and a first illuminating surface, and the first illuminating surface intersects with the first lateral surface and the second lateral surface, respectively, and the light guide plate comprises an incident surface, a bottom surface and a second illuminating surface, and the incident surface intersects with the bottom surface and the second illuminating surface, respectively, and the bottom surface and the second illuminating surface are oppositely located, and the incident surface of the light guide (Continued)

plate is located adjacent to the first illuminating surface, and the quantum dot film is located corresponding to the second lateral surface and the second illuminating surface.

18 Claims, 1 Drawing Sheet

(58) Field of Classification Search
CPC .. G02B 6/0073; G02B 6/0081; G02B 6/0086; G02B 6/0088; G02B 6/009; G02B 6/0091
USPC .............. 349/58–60, 65; 362/606–607, 612, 362/617–618, 632–634
See application file for complete search history.

(56) References Cited

U.S. PATENT DOCUMENTS

| | | | | |
|---|---|---|---|---|
| 2013/0033891 A1* | 2/2013 | Cheng | ................... | G02B 6/0023 362/602 |
| 2013/0208509 A1* | 8/2013 | Cheng | ............... | G02F 1/133382 362/613 |
| 2014/0036532 A1* | 2/2014 | Lee | ...................... | G02B 6/0021 362/608 |
| 2014/0043855 A1* | 2/2014 | Kang | ..................... | G02B 6/009 362/612 |
| 2016/0341885 A1* | 11/2016 | Xie | ................... | G02F 1/133608 |

FOREIGN PATENT DOCUMENTS

| | | |
|---|---|---|
| CN | 103742833 A | 4/2014 |
| CN | 104654116 A | 5/2015 |

* cited by examiner

BACKLIGHT MODULE AND DISPLAY DEVICE

CROSS REFERENCE

This application claims the priority of Chinese Patent Application No. 201510311691.1, entitled "Backlight module and display device", filed on Jun. 9, 2015, the disclosure of which is incorporated herein by reference in its entirety.

FIELD OF THE INVENTION

The present invention relates to a flat panel display field, and more particularly to a backlight module and a display device.

BACKGROUND OF THE INVENTION

The Liquid Crystal Display (LCD) is a common electronic device, and possesses properties of low power consumption, small volume and light weight. Therefore, it has been favored by the users. The Liquid Crystal Display comprises a liquid crystal display panel and a backlight module. The backlight module is located close to the liquid crystal display panel and employed to provide an area light source for the liquid crystal display panel. Generally, the backlight module comprises a light source and a light guide plate. The light emitted from the light source enters the light guide plate through the incident surface of the light guide plate. After being diffused with the light guide plate, the light exits through the illuminating surface of the light guide plate and provides an area light source for the liquid crystal display panel. The quantum dots can be utilized to emit spectrally concentrated, very pure mono lights for achieving the better image colors. Therefore, it is considered to surpass the traditional phosphor property and possible to be applied in the backlight module. At present, the quantum dot application in the backlight module can be a quantum dot film. Generally, the quantum dot film is cut and applied in the backlight module. However, the unstability of the quantum dots, the edge of the quantum dot film in a certain range (such as, about 1 mm) after being cut can easily react with the oxygen or water vapor in the air. Consequently, the edge can fail after the quantum dot film is cut. The quality of the light emitted from the edge of the quantum dot film after being cut is affected. Moreover, the performance of the display image of the liquid crystal display device is influenced.

SUMMARY OF THE INVENTION

The present invention provides a backlight module, wherein the backlight module comprises a glue frame, a light source, a circuit board, a light guide plate and a quantum dot film, and the light source is employed to emit first light, and the light source comprises a first lateral surface, a second lateral surface and a first illuminating surface, and the first lateral surface and the second lateral surface are oppositely located, and the first illuminating surface intersects with the first lateral surface and the second lateral surface, respectively, and the first illuminating surface is employed for illuminating the first light, and the circuit board supports the light source through the first lateral surface, and the light guide plate comprises an incident surface, a bottom surface and a second illuminating surface, and the incident surface intersects with the bottom surface and the second illuminating surface, respectively, and the bottom surface and the second illuminating surface are oppositely located, and the incident surface of the light guide plate is located adjacent to the first illuminating surface, and the first light enters the light guide plate through the incident surface of the light guide plate, and exits through the second illuminating surface, and the quantum dot film is located corresponding to the second lateral surface and the second illuminating surface, and the quantum dot film is employed to convert the first light into second light.

The glue frame comprises a mainbody and a loading part extending from a middle of a lateral surface of the mainbody, and an end surface intersecting with the mainbody is formed on the loading part, and the light source comprises a light source bottom surface oppositely located to the first illuminating surface, and the light source bottom surface is located adjacent to the loading part, and the quantum dot film covers the end surface, the second lateral surface and the second illuminating surface.

The backlight module further comprises at least one optical film, and the optical film is located at one side of the quantum dot film away from the light guide plate.

The optical film is located corresponding to the end surface, the second lateral surface and the second illuminating surface.

The optical film is a brightness enhancement film.

The backlight module further comprises a light shielding element, and the light shielding element is located on the optical film, and corresponding to the second lateral surface and partially corresponding to the second illuminating surface adjacent to the second lateral surface.

The backlight module further comprises a first double-side tape and a reflective sheet, and the first double-side tape is employed to bond the reflective sheet and the light guide plate, and the first double-side tape is covered by the light shielding element, and the reflective sheet is located adjacent to the bottom surface of the light guide plate.

The backlight module further comprises a second double-side tape, and the second double-side tape is employed to bond the circuit board and the glue frame, and to bond the circuit board and the light guide plate.

The light source is a blue light emitting diode, and the first light is blue light, and the first light is employed to excite the quantum dot film to generate red, green lights, and the first light emitted by the light source which is blue light and the red, green lights generated by exciting the quantum dot film are mixed to generate the second light which is white light.

The present invention further provides a display device, and the display device comprises the backlight module according any one of the aforementioned embodiments.

In comparison with prior arts, in the backlight module of the present invention, the quantum dot film is located corresponding to the second lateral surface and the second illuminating surface of the light source, and thus, the edge of the quantum dot film is located corresponding to the second lateral surface of the light source. Even the edge of the quantum dot film reacts with the oxygen or water vapor in the air and fails, the part of the quantum dot film located corresponding to the second lateral surface will not be affected. Moreover, the quality of the light generated after the light exiting from the second illuminating surface irradiates the quantum dot film will not be influenced. Therefore, the backlight module possesses better illumination quality, and the display device utilizing the backlight module has better display quality.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
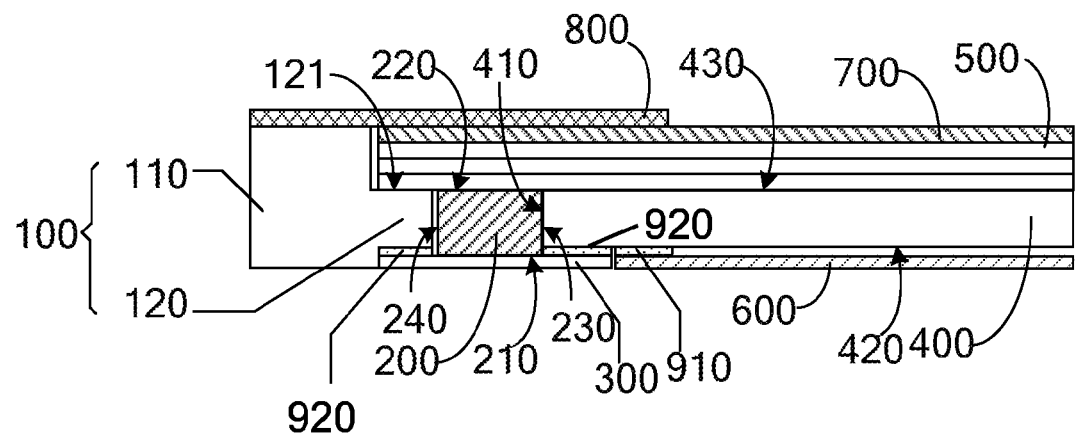
FIG. 1 is a structural diagram of a preferred embodiment according to a backlight module of the present invention.

Please refer to FIG. 1. FIG. 1 is a structural diagram of a preferred embodiment according to a backlight module of the present invention. The backlight module 10 is employed to provide a light source for a display panel in a display device. In this embodiment, the backlight module 10 is aside-light type backlight module. The backlight module 10 comprises a glue frame 100, a light source 200, a circuit board 300, a light guide plate 400 and a quantum dot film 500. The light source 200 is employed to emit first light, and the light source 200 comprises a first lateral surface 210, a second lateral surface 220 and a first illuminating surface 230. The first lateral surface 210 and the second lateral surface 220 are oppositely located, and the first illuminating surface 230 intersects with the first lateral surface 210 and the second lateral surface 220, respectively, and the first illuminating surface 230 is employed for illuminating the first light. The circuit board 300 supports the light source 200 through the first lateral surface 210, and provides electrical power and a control signal for the light source 200. The light guide plate 400 comprises an incident surface 410, a bottom surface 420 and a second illuminating surface 430. The incident surface 410 intersects with the bottom surface 420 and the second illuminating surface 430, respectively, and the bottom surface 420 and the second illuminating surface 430 are oppositely located, and the incident surface 410 of the light guide plate 400 is located adjacent to the first illuminating surface 230, and the first light enters the light guide plate 400 through the incident surface 410 of the light guide plate 400, and exits through the second illuminating surface 430. The quantum dot film 500 is located corresponding to the second lateral surface 220 and the second illuminating surface 430, and the quantum dot film 500 is employed to convert the first light into second light.

In the backlight module 10 of the present invention, the quantum dot film 500 is located corresponding to the second lateral surface 220 and the second illuminating surface 430 of the light source 200, and thus, the edge of the quantum dot film 500 is located corresponding to the second lateral surface 220 of the light source 200. Even the edge of the quantum dot film 500 reacts with the oxygen water vapor in the air and fails, the part of the quantum dot film 500 locate corresponding to the second illuminating surface 430 will not be affected. Moreover, the quality of the light generated after the light exiting from the second illuminating surface 430 irradiates the quantum dot film 500 will not be influenced. Therefore, the backlight module 10 possesses better illumination quality, and the display device utilizing the backlight module 10 has better display quality.

The glue frame 100 comprises a mainbody 110 and a loading part 120 extending from a middle of a lateral surface of the mainbody, and an end surface 121 intersecting with the mainbody 110 is formed on the loading part 120. The light source 200 comprises a light source bottom surface 240 oppositely located to the first illuminating surface 230, and the light source bottom surface 240 is located adjacent to the loading part 120. The quantum dot film 500 covers the end surface 121, the second lateral surface 220 and the second illuminating surface 430.

The backlight module 10 further comprises at least one optical film 700, and the optical film 700 is located at one side of the quantum dot film 500 away from the light guide plate 400. Preferably, the optical film 700 is located corresponding to the end surface 121, the second lateral surface 220 and the second illuminating surface 430. In this embodiment, the optical film 700 is a brightness enhancement film. The brightness enhancement film is employed to improve the illumination efficiency of the second light emitting to the display panel in the display device. The brightness enhancement film can be a normal prism sheet, a multifunction prism sheet, a micro-lens film and a reflective polarizer.

The backlight module 10 further comprises a light shielding element 800, and the light shielding element 800 is located on the optical film 700, and corresponding to the second lateral surface 220 and partially corresponding to the second illuminating surface 430 adjacent to the second lateral surface 220. The light shielding element 800 is employed to shield the glue frame 100 and the light source 200. In this embodiment, the light shielding element 800 is a black tape.

The backlight module 10 further comprises a first double-side tape 910 and a reflective sheet 600. The first double-side tape 910 is employed to bond the reflective sheet 600 and the light guide plate 400, and the first double-side tape 91 is covered by the light shielding element 800. The reflective sheet 600 is located adjacent to the bottom surface 420 of the light guide plate 400. The first light emitted from the light source 200 enters the light guide plate 400 through the incident surface 410. However, part of the first light exits through the bottom surface 420 of the light guide plate 400. If the part of the first light exited through the bottom surface 420 of the light guide plate 400, the illuminating light through the second illuminating surface 430 will be less. Then, the light emitted by the backlight module 10 into the display panel in the display device will be less. Accordingly, the brightness of the display panel is affected. By locating the reflective sheet 600 at the bottom surface 420 of the light guide plate 400, the light exiting through the bottom surface 420 of the light guide plate 400 is reflected back into the light guide plate 400 by the reflective sheet 600. Thus, the illuminating light through the second illuminating surface 430 is increased, and the light emitted by the backlight module 10 into the display panel in the display device will be increased. Accordingly, the brightness of the display panel is promoted.

The backlight module 10 further comprises a second double-side tape 920, and the second double-side tape 920 is employed to bond the circuit board 300 and the glue frame 100, and to bond the circuit board 300 and the light guide plate 400. In this embodiment, the circuit board circuit board 300 and the glue frame 100 are bonded with the second double-side tape 920, and the circuit board 300 and the light guide plate 400 are bonded with the second double-side tape 920. Thus, the relative position of the circuit board 300 between the glue frame 100 and the light guide plate 400 is fixed, and the position of the light source 200 relative to the light guide plate 400 is fixed. Accordingly, the low incidence rate of the first light emitted from the light source 200 incident into the light guide plate 400 due to that the position of the light source 200 relative to the light guide plate 400 is not fixed can be prevented.

In this embodiment, the light source 200 is a blue light emitting diode, and the first light emitted from the light source 200 is blue light, and the first light is employed to excite the quantum dot film 500 to generate red, green lights, and the first light emitted by the light source 200 which is blue light and the red, green light generated by exciting the quantum dot film 500 are mixed to generate the second light which is white light.

The quantum dots are employed to convert the light generated by the light emitting diode into visible light or infrared light. The quantum dots are nanocrystals of which the diameters are smaller than bulk exciton Bohr radius. Due to the quantum confinement effect, the energy difference among the electronic states of the quantum dots is a function of the components and physical dimensions of the quantum dots. Therefore, the optical and optoelectronics properties of the quantum dots can be tuned and adjusted by changing the physical dimensions of the quantum dots. The quantum dots can absorb all wavelengths of which the peak wavelengths are shorter and emits light with longer wavelength. 2 nm CdSe quantum dot can emit light in blue region of the visible light, and 10 nm CdSe quantum dot can emit light in red region of the visible light. As the quantum dot is applied to the display technology, the quantum dots can be utilized to emit spectrally concentrated, very pure, high quality red/green mono lights, which completely surpass the phosphor property of the traditional light emitting diode backlight and realize better image colors. Therefore, the quantum dot display technology is considered to be the best solution of high performance, high display color gamut in the future, and even the new technical representative of the global display industry.

In comparison with prior arts, in the backlight module 10 of the present invention, the quantum dot film 500 is located corresponding to the second lateral surface 220 and the second illuminating surface 430 of the light source 200, and thus, the edge of the quantum dot film 500 is located corresponding to the second lateral surface 220 of the light source 200. Even the edge of the quantum dot film 500 reacts with the oxygen or water vapor in the air and fails, the part of the quantum dot film 500 located corresponding to the second lateral surface 220 will not be affected. Moreover, the quality of the light generated after the light exiting from the second illuminating surface 430 irradiates the quantum dot film 500 will not be influenced. Therefore, the backlight module 10 possesses better illumination quality and the display device utilizing the backlight module 10 has better display quality.

Figure 2:
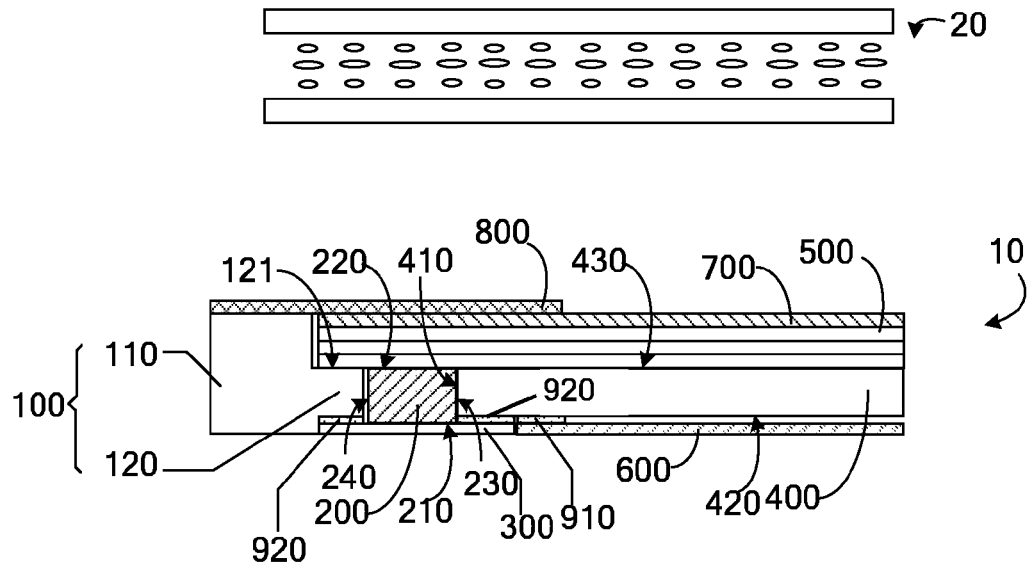
FIG. 2 is a structural diagram of a preferred embodiment according to a display device of the present invention.

Besides, the present invention further provides a display device. Please refer to FIG. 2. FIG. 2 is a structural diagram of a preferred embodiment according to a display device of the present invention. The display device 1 comprises a backlight module 10 and a display panel 20. The backlight module 10 is located adjacent to the display panel 20. The backlight module 10 is employed to provide light for the display panel 20. The display 20 is employed for showing words or pictures in the light provided by the backlight module 10.

In this embodiment, the backlight module 10 is aside-light type backlight module. The backlight module 10 comprises a glue frame 100, a light source 200, a circuit board 300, a light guide plate 400 and a quantum dot film 500. The light source 200 is employed to emit first light, and the light source 200 comprises a first lateral surface 210, a second lateral surface 220 and a first illuminating surface 230. The first lateral surface 210 and the second lateral surface 220 are oppositely located, and the first illuminating surface 230 intersects with the first lateral surface 210 and the second lateral surface 220, respectively, and the first illuminating surface 230 is employed for illuminating the first light. The circuit board 300 supports the light source 200 through the first lateral surface 210, and provides electrical power and a control signal for the light source 200. The light guide plate 400 comprises an incident surface 410, a bottom surface 420 and a second illuminating surface 430. The incident surface 410 intersects with the bottom surface 420 and the second illuminating surface 430, respectively, and the bottom surface 420 and the second illuminating surface 430 are oppositely located, and the incident surface 410 of the light guide plate 400 is located adjacent to the first illuminating surface 230, and the first light enters the light guide plate 400 through the incident surface 410 of the light guide plate 400, and exits through the second illuminating surface 430. The quantum dot film 500 is located corresponding to the second lateral surface 220 and the second illuminating surface 430, and the quantum dot film 500 is employed to convert the first light into second light.

In the backlight module 10 of the present invention, the quantum dot film 50 is located corresponding to the second lateral surface 220 and the second illuminating surface 430 of the light source 200, and thus, the edge of the quantum dot film 500 is located corresponding to the second lateral surface 220 of the light source 200. Even the edge of the quantum dot film 500 reacts with the oxygen or water vapor in the air and fails, the part of the quantum dot film 500 located corresponding to the second illuminating surface 430 will not be affected. Moreover, the quality of the light generated after the light exiting from the second illuminating surface 430 irradiates the quantum dot film 500 will not be influenced. Therefore, the backlight module 10 possesses better illumination quality, and the display device utilizing the backlight module 10 has better display quality.

The glue frame 100 comprises a mainbody 110 and a loading part 120 extending from a middle of a lateral surface of the mainbody, and an end surface 121 intersecting with the mainbody 110 is formed on the loading part 120. The light source 200 comprises a light source bottom surface 240 oppositely located to the first illuminating surface 230, and the light source bottom surface 240 is located adjacent to the loading part 120. The quantum dot film 500 covers the end surface 121, the second lateral surface 220 and the second illuminating surface 430.

The backlight module 10 further comprises at least one optical film 700, and the optical film 700 is located at one side of the quantum dot film 500 away from the light guide plate 400. Preferably, the optical film 700 is located corresponding to the end surface 121, the second lateral surface 220 and the second illuminating surface 430. In this embodiment, the optical film 700 is a brightness enhancement film. The brightness enhancement film is employed to improve the illumination efficiency of the second light emitting to the display panel in the display device. The brightness enhancement film can be a normal prism sheet, a multifunction prism sheet, a micro-lens film and a reflective polarizer.

The backlight module 10 further comprises a light shielding element 800, and the light shielding element 800 is located on the optical film 700, and corresponding to the second lateral surface 220 and partially corresponding to the second illuminating surface 430 adjacent to the second lateral surface 220. The light shielding element 800 is employed to shield the glue frame 100 and the light source 200. In this embodiment, the light shielding element 800 is a black tape.

The backlight module 10 further comprises a first double-side tape 910 and a reflective sheet 600. The first double-side tape 910 is employed to bond the reflective sheet 600 and the light guide plate 400, and the first double-side tape 910 is covered by the light shielding element 800. The reflective sheet 600 is located adjacent to the bottom surface 420 of the light guide plate 400. The first light emitted from the light source 200 enters the light guide plate 400 through the incident surface 410. However, part of the first light exits through the bottom surface 420 of the light guide plate 400. If the part of the first light exited through the bottom surface 420 of the light guide plate 400, the illuminating light through the second illuminating surface 430 will be less. Then, the light emitted by the backlight module 10 into the display panel in the display device will be less. Accordingly, the brightness of the display panel is affected. By locating the reflective sheet 600 at the bottom surface 420 of the light guide plate 400, the light exiting through the bottom surface 420 of the light guide plate 400 is reflected back into the light guide plate 400 by the reflective sheet 600. Thus, the illuminating light through the second illuminating surface 430 is increased, and the light emitted by the backlight module 10 into the display panel in the display device will be increased. Accordingly, the brightness of the display panel is promoted.

The backlight module 10 further comprises a second double-side tape 920, and the second double-side tape 920 is employed to bond the circuit board 300 and the glue frame 100, and to bond the circuit board 300 and the light guide plate 400. In this embodiment, the circuit board circuit board 300 and the glue frame 100 are bonded with the second double-side tape 920, and the circuit board 300 and the light guide plate 400 are bonded with the second double-side tape 920. Thus, the relative position of the circuit board 300 between the glue frame 100 and the light guide plate 400 is fixed, and the position of the light source 200 relative to the light guide plate 400 is fixed. Accordingly, the low incidence rate of the first light emitted from the light source 200 incident into the light guide plate 400 due to that the position of the light source 200 relative to the light guide plate 400 is not fixed can be prevented.

In this embodiment, the light source 200 is a blue light emitting diode, and the first light emitted from the light source 200 is blue light, and the first light is employed to excite the quantum dot film 500 to generate red, green lights, and the first light emitted by the light source 200 which is blue light and the red, green lights generated by exciting the quantum dot film 500 are mixed to generate the second light which is white light.

In comparison with prior arts, in the backlight module 10 of the present invention, the quantum dot film 500 is located corresponding to the second lateral surface 220 and the second illuminating surface 430 of the light source 200, and thus, the edge of the quantum dot film 500 is located corresponding to the second lateral surface 220 of the light source 200. Even the edge of the quantum dot film 500 reacts with the oxygen or water vapor in the air and fails, the part of the quantum dot film 500 located corresponding to the second lateral surface 220 will not be affected. Moreover, the quality of the light generated after the light exiting from the second illuminating surface 430 irradiates the quantum dot film 500 will not be influenced. Therefore, the backlight module 10 possesses better illumination quality, and the display device 1 utilizing the backlight module 10 has better display quality.

Above are embodiments of the present invention, which does not limit the scope of the present invention. Any modifications, equivalent replacements or improvements within the spirit and principles of the embodiment described above should be covered by the protected scope of the invention.

What is claimed is:

1. A backlight module, wherein the backlight module comprises a glue frame, a light source, a circuit board, a light guide plate and a quantum dot film, and the light source is employed to emit first light, and the light source comprises a first lateral surface, a second lateral surface and a first illuminating surface, and the first lateral surface and the second lateral surface are oppositely located, and the first illuminating surface intersects with the first lateral surface and the second lateral surface, respectively, and the first illuminating surface is employed for illuminating the first light, and the circuit board supports the light source through the first lateral surface, and the light guide plate comprises an incident surface, a bottom surface and a second illuminating surface, and the incident surface intersects with the bottom surface and the second illuminating surface, respectively, and the bottom surface and the second illuminating surface are oppositely located, and the incident surface of the light guide plate is located adjacent to the first illuminating surface, and the first light enters the light guide plate through the incident surface of the light guide plate, and exits through the second illuminating surface, and the quantum dot film is located corresponding to the second lateral surface and the second illuminating surface, and the quantum dot film is employed to convert the first light into second light, wherein the glue frame comprises a mainbody and a loading part extending from a middle of a lateral surface of the mainbody, and an end surface intersecting with the mainbody is formed on the loading part, and the quantum dot film covers and directly contacts with the end surface, the second lateral surface and the second illuminating surface, which are in a same plane to prevent a failure of an edge of the quantum dot film.

2. The backlight module according to claim 1, wherein the light source comprises a light source bottom surface oppositely located to the first illuminating surface, and the light source bottom surface is located adjacent to the loading part.

3. The backlight module according to claim 2, wherein the backlight module further comprises at least one optical film, and the optical film is located at one side of the quantum dot film away from the light guide plate.

4. The backlight module according to claim 3, wherein the optical film is located corresponding to the end surface, the second lateral surface and the second illuminating surface.

5. The backlight module according to claim 3, wherein the optical film is a brightness enhancement film.

6. The backlight module according to claim 3, wherein the backlight module further comprises a light shielding element, and the light shielding element is located on the optical film, and corresponding to the second lateral surface and partially corresponding to the second illuminating surface adjacent the second lateral surface.

7. The backlight module according to claim 6, wherein the backlight module further comprises a first double-side tape and a reflective sheet, and the first double-side tape is employed to bond the reflective sheet and the light guide plate, and the first double-side tape is covered by the light shielding element, and the reflective sheet is located adjacent to the bottom surface of the light guide plate.

8. The backlight module according to claim 1, wherein the backlight module further comprises a second double-side tape, and the second double-side tape is employed to bond the circuit board and the glue frame, and to bond the circuit board and the light guide plate.

9. The backlight module according to claim 1, wherein the light source is a blue light emitting diode, and the first light is blue light, and the first light is employed to excite the quantum dot film to generate red, green lights, and the first light emitted by the light source which is blue light and the red, green lights generated by exciting the quantum dot film are mixed to generate the second light which is white light.

10. A display device, wherein the display device comprises a backlight module, and the backlight module comprises a glue frame, a light source, a circuit board, a light guide plate and a quantum dot film, and the light source is employed to emit first light, and the light source comprises a first lateral surface, a second lateral surface and a first illuminating surface, and the first lateral surface and the second lateral surface are oppositely located, and the first illuminating surface intersects with the first lateral surface and the second lateral surface, respectively, and the first illuminating surface is employed for illuminating the first light, and the circuit board supports the light source through the first lateral surface, and the light guide plate comprises an incident surface, a bottom surface and a second illuminating surface, and the incident surface intersects with the bottom surface and the second illuminating surface, respectively, and the bottom surface and the second illuminating surface are oppositely located, and the incident surface of the light guide plate is located adjacent to the first illuminating surface, and the first light enters the light guide plate through the incident surface of the light guide plate, and exits through the second illuminating surface, and the quantum dot film is located corresponding to the second lateral surface and the second illuminating surface, and the quantum dot film is employed to convert the first light into second light, wherein the glue frame comprises a mainbody and a loading part extending from a middle of a lateral surface of the mainbody, and an end surface intersecting with the mainbody is formed on the loading part, and the quantum dot film covers and directly contacts with the end surface, the second lateral surface and the second illuminating surface, which are in a same plane to prevent a failure of an edge of the quantum dot film.

11. The display device according to claim 10, wherein the light source comprises a light source bottom surface oppositely located to the first illuminating surface, and the light source bottom surface is located adjacent to the loading part.

12. The display device according to claim 11, wherein the backlight module further comprises at least one optical film, and the optical film is located at one side of the quantum dot film away from the light guide plate.

13. The display device according to claim 12, wherein the optical film is located corresponding to the end surface, the second lateral surface and the second illuminating surface.

14. The display device according to claim 12, wherein the optical film is a brightness enhancement film.

15. The display device according to claim 12, wherein the backlight module further comprises a light shielding element, and the light shielding element is located on the optical film, and corresponding to the second lateral surface and partially corresponding to the second illuminating surface adjacent the second lateral surface.

16. The display device according to claim 15, wherein the backlight module further comprises a first double-side tape and a reflective sheet, and the first double-side tape is employed to bond the reflective sheet and the light guide plate, and the first double-side tape is covered by the light shielding element, and the reflective sheet is located adjacent to the bottom surface of the light guide plate.

17. The display device according to claim 10, wherein the backlight module further comprises a second double-side tape, and the second double-side tape is employed to bond the circuit board and the glue frame, and to bond the circuit board and the light guide plate.

18. The display device according to claim 10, wherein the light source is a blue light emitting diode, and the first light is blue light, and the first light is employed to excite the quantum dot film to generate red, green lights, and the first light emitted by the light source which is blue light and the red, green lights generated by exciting the quantum dot film are mixed to generate the second light which is white light.

* * * * *